United States Patent
Mauuary et al.

[11] Patent Number: 6,157,909
[45] Date of Patent: Dec. 5, 2000

[54] PROCESS AND DEVICE FOR BLIND EQUALIZATION OF THE EFFECTS OF A TRANSMISSION CHANNEL ON A DIGITAL SPEECH SIGNAL

[75] Inventors: Laurent Mauuary, Louannec; Jean Monne, Perros Guirec, both of France

[73] Assignee: France Telecom, Paris, France

[21] Appl. No.: 09/119,279

[22] Filed: Jul. 20, 1998

[30] Foreign Application Priority Data

Jul. 22, 1997 [FR] France .................................. 97 09273

[51] Int. Cl.$^7$ .................................................. G10L 21/02
[52] U.S. Cl. .......................................... 704/228; 704/234
[58] Field of Search .................................. 704/226–228, 704/204, 234; 375/232

[56] References Cited

U.S. PATENT DOCUMENTS

| | | | |
|---|---|---|---|
| 5,598,505 | 1/1997 | Austin et al. | 704/226 |
| 5,905,969 | 5/1999 | Mokbel et al. | 704/203 |

FOREIGN PATENT DOCUMENTS

| | | |
|---|---|---|
| 0 692 883 | 1/1996 | European Pat. Off. . |
| 0 780 828 A2 | 6/1997 | European Pat. Off. . |

OTHER PUBLICATIONS

Tokuda, K., Kobayashi, T., Shiomoto, S., Imai, S., "Adaptive Filtering Based On Cepstral Representation–Adaptive Cepstral Analysis Of Speech, " 1990 Int. Conf. on Acoust. Speech and Sig. Proc. 1990. ICASSP–90., pp.:377–380 vol. 1, Apr.1990.

French Preliminary Search Report dated Mar. 26, 1998, French Appl. No. FR 9709273.

Mokbel et al., "Deconvolution of Telephone Line Effects for Speech Recognition," *Speech Communication*, 19, pp. 185–196 (1996).

Benveniste et al., "Blind Equalizers," *IEEE Transactions on Communications*, vol. Com–32, No. 8, pp. 871–882 (Aug. 1994).

Hermansky et al., "Compensation for the Effect of the Communication Channel in Auditory–Like Analysis of Speech," (*RASTA–PLP*), *Eurospeech*, pp. 1367–2770 (1991).

Shynk, J., "Frequency–Domain and Multirate Adaptive Filtering," *IEEE Signal Processing Magazine*, pp. 14–37 (Jan. 1992).

Widrow et al., "Adaptive Noise Cancelling: Principles and Applications," *Proc. of IEEE*, vol. 63, No. 12, pp. 1692–1716 (Dec. 1975).

*Primary Examiner*—David R. Hudspeth
*Assistant Examiner*—Donald L. Storm
*Attorney, Agent, or Firm*—Marshall, O'Toole, Gerstein, Murray & Borun

[57] ABSTRACT

A process and device for blind equalization of the effects of a transmission channel on a speech signal. The speech signal is transformed into cepstral vectors which are representative of the speech signal over a given horizon. A reference cepstrum consisting of a constant cepstrum signal representative of the long-term cepstrum of the speech signal is calculated for each cepstral vector. Each of the cepstral vectors is subjected to adaptive filtering by LMS on the basis of the reference cepstrum so as to generate a set of equalized cepstral vectors on the basis of the calculation of an error signal between the reference cepstrum and equalized cepstral vectors. The error signal is expressed as the difference between the reference cepstrum component of a given rank and the component of the same rank of the equalized cepstral vector.

7 Claims, 3 Drawing Sheets

CALCULATION OF THE CEPSTRUM

CALCULATION OF THE MFCCs

SELF-LEARNING (BLIND) EQUALISER USED
IN DIGITAL TRANSMISSION

PROCESS AND DEVICE FOR BLIND EQUALIZATION OF THE EFFECTS OF A TRANSMISSION CHANNEL ON A DIGITAL SPEECH SIGNAL

FIELD OF THE INVENTION

The invention relates to a process and a device for blind equalisation of the effects of a transmission channel on a digital speech signal.

OBJECTS OF THE INVENTION

The faithful transmission of a speech signal is currently a major objective owing, in particular, to the improvement in the performance of automatic speech recognition systems, ASR systems, which operate via the public switched telephone network or the mobile telephone network, GSM.

The main problem in obtaining a satisfactory, substantially constant recognition rate is due to the variabilities that exist in the acoustic signal carrying the speech.

The sources of variability are numerous and one normally distinguishes between two types of variability, intrinsic variability and variability which is extrinsic to the speaker. In fact, the acoustic creations of a single word differ according to the state of the speaker or the context of the word in the sentence, for example. This difference is even greater if one also compares the acoustic creations of several speakers. The acoustic creations of the words are in fact sound waves that have to be picked up in order to subject them to a recognition process. During the acquisition of a sound wave or speech wave, various types of interference are added to it and this has the effect of increasing the variability of the signal picked up. Ambient noise also constitutes a sound wave picked up by the microphone and therefore additionally mixed with the speech wave. The electronic signal transmitted by the microphone is a sum signal of signals corresponding to the speech and to the ambient noise.

Furthermore, in particular in applications employing the telephone network, the aquisition module formed by the microphone of the handset and by the telephone lines connecting the user to the speech recognition system acts as a linear convolution filter that varies slowly over time.

With a conventional handset, not operating in hands-free mode, the effects of the ambient noise are generally negligible and the convolutional effects of the transmission lines mainly have to be taken into consideration. Thus, each signal observed at the input of the automatic speech recognition system contains a convolutional component that is almost constant for a given call but varies from one call to another.

This convolutional component is detrimental to the efficiency of speech recognition. In order to identify its effect, it is essential to project this component into the representational space in which recognition is performed, that is the cepstral space in the majority of recognition systems.

By way of example, it must be noted here, with reference to FIG. 1a relating to cepstral representation that, upstream of an ASR system, a parameterisation module transforms the digitised speech signal into a stream of vectors having parameters, calculated over windows of fixed length, of 10 to 40 ms and which overlap. In principle, the overlap is about 50%. These parameter vectors are selected to represent the most pertinent information possible in the window of the signal. As shown in FIG. 1a, which relates to the general principle for calculation of the cepstrum, a frequency transform, FFT, calculates the spectrum of the signal window. The logarithm of the spectral energy is then calculated. The cepstrum ($C_n(i)$) is obtained by reverse FFT using this logarithm. Generally it is only the first ten cepstral coefficients that are taken into consideration. These coefficients are thus assumed to model the impulse response of the voice path and thus to carry the relevant information for the recognition process. Furthermore, these coefficients are insensitive to the energy of the input signal, a major characteristic where automatic speech recognition is concerned.

Further representations of the same type have been used, in particular with the specific aim of speech recognition. This is the case with the ASR system developed in France by the France Télécom R&D Center, the PHIL90 system which uses MFCC, or "MEL frequency based Cepstral Coefficients" as parameter vectors. These coefficients smooth the spectrum $\{S_n(f)\}$ to estimate the spectral envelope and psychoacoustic knowledge. The spectral smoothing is carried out by a filter bank. The human auditory system analyses low frequencies with higher resolution than other frequencies while in a speech signal, furthermore, the low frequencies are richer in information than the high frequencies, so the critical bands of the filter bank are distributed over a non-linear scale of perception known as MEL or BARK. The method of calculating MFCCs, with reference to FIG. 1b consists, after frequency transformation of the window of the signal, FTT, then filtering, MEL, in calculating for each window of the signal a vector formed from the energy in each of the frequency bands. Reverse frequency transformation, reverse FTT, carried out by reverse transformation, yields the coefficients MFCC.

In the space corresponding to these types of representation, a convolutional filter representing the transmission channel is transformed into an almost constant additive bias that is contained in the cepstral vectors. To examine these representations more closely, reference can be made to the following articles, published by:

H. HERMANSKY, N. MORGAN, A. BAYYA, P. KOHN "*Compensation for the Effect of the Communication Channel in Auditory-like Analysis of Speech*" (RASTA-PLP), Eurospeech, pp. 1367–1370, Genova 1991;

C. MOKBEL, D. JOUVET, J. MONNE "*Deconvolution of Telephone Line Effects for Speech Recognition*", Speech Communication, Vol. 19, No. 3, September 1996, pp. 185–196.

The bias thus introduced changes from one call to another. Owing to this transformation and this representation, the cepstral vectors corresponding to a given sound therefore occupy an extended portion, owing to the presence of bias, in the representation space. The existence of this bias therefore has the effect of reducing the capacity for discrimination between cepstral vectors corresponding to different sounds and therefore involves the deployment of models that are more complex to enable discrimination between the various forms of the vocabulary of the application.

Consequently, to minimise the effects of telephone lines on a n observed signal, for an ASR process for example, the problem posed essentially relates to blind deconvolution of two signals because a single sensor, terminal, is available. However, the original speech signal and the transfer function of the channel occupy the same frequency zones and therefore have a large portion in common in the cepstral space. It is therefore particularly awkward to define lifters, lifters being defined, by convention, as attenuating modules or filters in the cepstral domain, in order to reduce or suppress the contribution of the channel transfer function and consequently achieve the desired deconvolution.

The current techniques employed relate, on the one hand, in the field of automatic speech recognition, to the robustness of the recognition process to the telephone signal acquisition conditions and, on the other hand, in the field of signal processing, to the reduction of interference in a telephone signal in order to improve its intelligibility.

SUMMARY OF THE INVENTION

When the recognition process is applied locally for the voice control of hands-free telephones, computers, data terminals or the like, the efforts required to reduce the interference in the signal are concentrated on the reduction of interference introduced by the additive noise. In the aforementioned context, normal techniques cover the definition of robust representations, filtering such as spectral subtraction, antenna filtering, filtering by status of Markov models or even the on-line addition of the ambient noise to the signal or the reference models.

In the context of a centralised recognition process, efforts are also made to reduce the effects of the telephone communications. The technique generally employed is subtraction from the cepstral vectors of their direct component estimated over a sufficiently wide horizon. It is stated that the notion of horizon designates, for a digital telephone signal that is subdivided into windows, an integer number of successive windows. This subtraction can be carried out either explicitly by estimating and subtracting the average, or implicitly by high-pass filtering. Recent work has demonstrated that the average of the cepstral vectors over a sufficiently wide horizon represents the effects of the telephone lines exactly. See the article by C. MOKBEL, J. MONNE and D. JOUVET mentioned hereinbefore.

There are two main types of deconvolution procedures in the general context of signal deconvolution.

The first type, known as blind deconvolution, is based on the spectral, cepstral or temporal properties of the signals for defining deconvolution patterns. In the field of telecommunications, adaptive equalisation algorithms are similar to blind deconvolution. For a more detailed description of this type of algorithm, reference can be made to the article published by A. BENVENISTE and M. GOURSAT, "*Blind Equalizers*", IEEE Transactions on Communications, Vol. COM-32, No. 8, August 1984, pp. 871–883, 1984.

The second type, similarly to the procedure deployed by echo cancelling or dereverberation algorithms, employs adaptive filtering, or spatial filtering in the case of an acoustic antenna. In such a case, there are generally several sensors, and at least two, one being used for the reference signal and the other for the input signal. For a more detailed description of this type of adaptive filtering, reference can be made to the article published by B. WIDROW & al., "*Adaptive Noise Cancelling: Principles and Applications*", Proc. of IEEE, vol. 63, No. 12, pp. 1692–1716, December 1975.

In the more specific context of the transmission of digital signals, the problems posed by equalisation procedures are of the same type owing to the fact that it is difficult to obtain a clean reference signal for the use of a conventional filtering pattern to cancel the effect of the transmission channel. In fact, the only signal available is the observed, already transmitted digital signal. To simplify the equalisation process, known digital sequences of the receiver can be transmitted to the receiver in order to identify the transfer function of the channel. However, this mode of operation quickly saturates the transmission capacity of the channel.

To overcome this drawback, various investigations have been carried out to establish a blind equalisation procedure. This blind equalisation procedure uses known decision logic and long-term statistics on the transmitted digital signal in order to calculate the error used to update the coefficients of a filter by stochastic gradient descent. The general pattern of such a process is shown in FIG. 1c. For a more detailed description of this type of procedure, reference can be made, for example, to the article published by J. J. SHYNK, "*Frequency-Domain and Multirate Adaptive Filtering*", IEEE Signal Processing Magazine, pp. 15–37, January 1992.

Furthermore, French patent application No. 94 08741, filed on Jul. 13th 1994 in the name of France Télecom, relates to a process and a system for adaptive filtering by blind equalisation of a digital telephone signal.

In the aforementioned process and system, the digital signal is subjected to frequency transformation, FFT, and to sub-band filtering. Each sub-band signal is subjected to adaptive filtering on the basis of a reference signal based on long-term statistics on the telephone signal. Equalisation by blind deconvolution of the effects of the telephone line on the digital telephone signal is thus performed.

This mode of operation, which is essentially based on a procedure for blind equalisation in the frequency, and therefore spectral, domain, justified by the long-term statistical properties of the signal passing through the telephone line is satisfactory.

The object of the present invention is, however, to deploy a process for blind equalisation by adaptive filtering directly applied to the cepstral domain.

A further object of the present invention, owing to this direct application to the cepstral domain, is also to reduce the overall cost of calculation.

A further object of the present invention is also to reduce the number of outputs of the filter used.

A further object of the present invention, owing to this direct application to the cepstral domain, is to adapt the processing procedures better to speech recognition, in particular to the PHIL90 system.

A further object of the present invention is, finally, to implement a processing procedure which, in certain specific situations, improves the recognition rates in comparison with those obtained using blind equalisation in the spectral domain in the prior art.

The process and device, objects of the present invention, are noteworthy in that the speech signal $s_n(t)$ is transformed into cepstral vectors. Each cepstral vector is subjected to adaptive filtering on the basis of a reference cepstrum representative of the long-term cepstrum of the speech signal, to generate equalised cepstral vectors representative of the equalised speech signal.

BRIEF DESCRIPTION OF THE DRAWINGS

The process and the device for blind equalisation of the effects of a transmission channel on a digital signal, objects of the present invention, will be understood better on reading the following description and observing the following drawings In which, apart from FIG. 1a to 1c relating to the prior art:

FIG. 2b shows, in the form of block diagrams, a detail of the implementation of the process that is the object of the invention as shown in FIG. 2a;

FIG. 3b and 3c show a particular embodiment of the device, object of the invention, illustrated in FIG. 3a.

DESCRIPTION OF THE PREFERRED EMBODIMENTS

A more detailed description of the process for blind equalisation of the effects of a transmission channel on a digital speech signal according to the object of the present invention will now be described with reference to FIG. 2a and FIG. 2b.

Figure 1A:
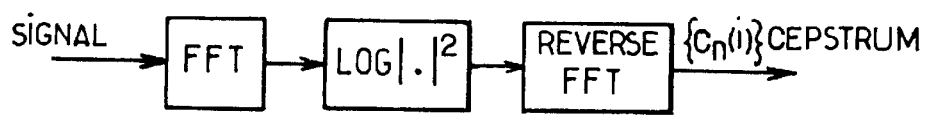
Figure 1B:
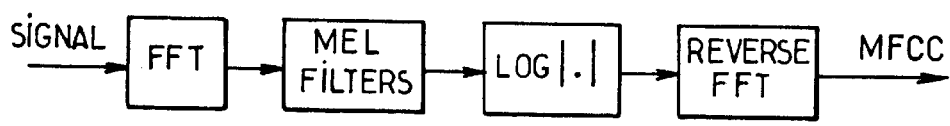
Figure 1C:
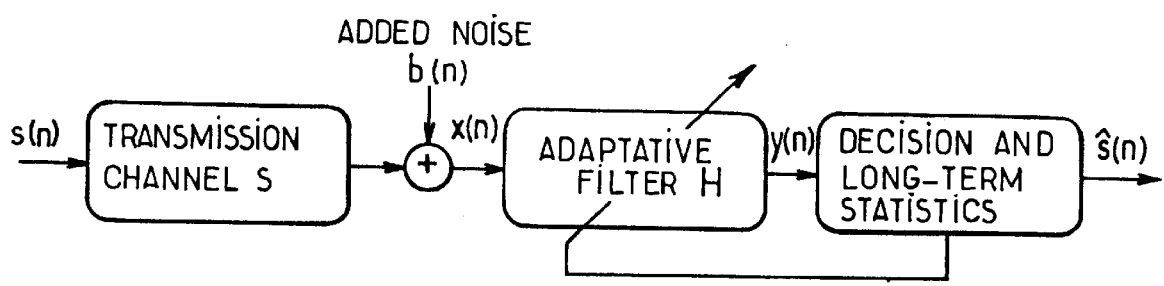
Figure 2A:
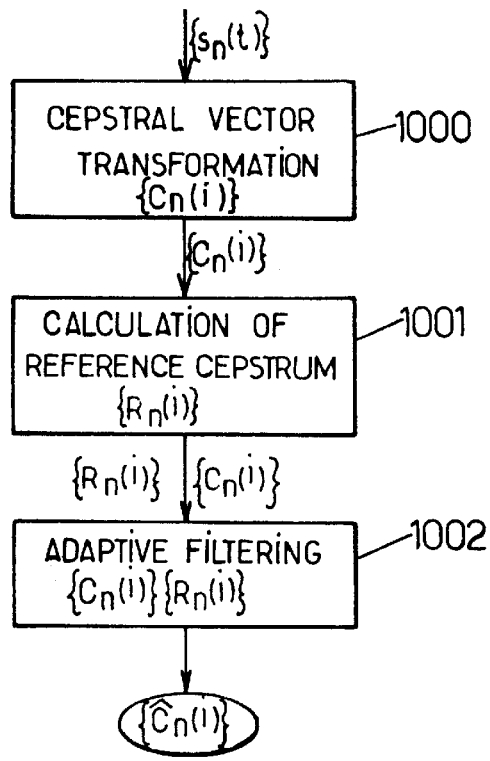
FIG. 2a is a general flow chart in the form of block diagrams of the process that is the object of the present invention.
Figure 2B:
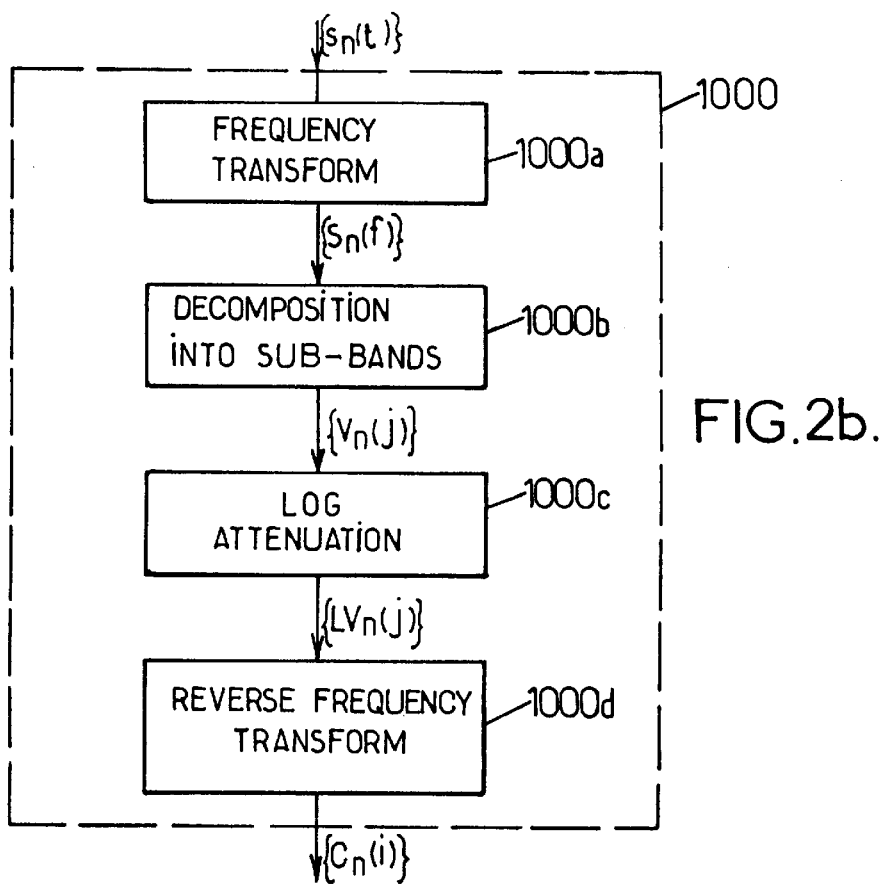

In the aforementioned FIG. 2a, the digital speech signal is designated $\{S_n(t)\}$, this signal allegedly passing through the transmission channel on which blind equalisation is to be implemented in accordance with the process forming the object of the present invention.

In general, the digital speech signal is conventionally subdivided into successive blocks which possibly overlap, n designating the rank of the current block and, by extension, the rank of any dataset, or frame, obtained by implementing the process that is the object of the present invention, on the basis of this current block.

According to the aforementioned figure, the process involves at least subjecting the digital speech signal $\{s_n(t)\}$ to transformation into a set of cepstral vectors, the vector associated with the raster of rank n being designated $\{C_n(i)\}$, $C_n(i)$ designating the component, or cepstral coefficient, of rank i of each cepstral vector, this transformation being carried out in a stage designated 1000 in the aforementioned figure. The set of cepstral vectors is representative of the digital speech signal $\{s_n(t)\}$ over a given horizon, the notion of horizon being defined in accordance with the definition previously given in the specification.

The aforementioned stage 1000, after which the cepstral vectors $\{C_n(i)\}$ are available, is followed by a stage designated 1001 which involves calculating a reference cepstrum, designated $\{R_n(i)\}$, this cepstrum being representative, for each of the cepstral vectors $\{C_n(i)\}$ of the set of cepstral vectors, of the long-term cepstrum of this speech signal.

It is in fact stated that it has been established, with reference to the publication by C. MOKBEL, D. JOUVET and J. MONNE previously mentioned in the specification, that the long-term cepstrum of the speech signal is almost constant over all quefrencies, the notion of quefrency in the cepstral domain being the analogue of the notion of frequency in the spectral domain. Furthermore, and with reference to the above-mentioned publication, the average of the logarithms of the spectral densities, and therefore also the average of the cepstral coefficients, over a sufficiently wide horizon, represents a constant convolutional component in the observed signal which can be validly equated to the effect of the transmission channel.

Consequently, the aforementioned stage 1001 is followed by a stage 1002 which involves subjecting each of the cepstral vectors $\{C_n(i)\}$ to adaptive filtering on the basis of the reference cepstrum $\{R_n(i)\}$ to generate a set of equalised cepstral vectors designated $\{\hat{C}_n(i)\}$ in which the effect of the transmission channel is substantially suppressed. This set of equalised cepstral vectors is representative of an equalised digital speech signal.

Thus, according to the process that is the object of the present invention, the adaptive filtering carried out in stage 1002 is performed on the basis of the reference input constituted by the reference cepstrum $\{R_n(i)\}$, adaptive filtering obviously being installed in the cepstral domain and applied to the cepstral coefficients $C_n(i)$.

With regard to implementation of the aforementioned adaptive filtering, it is mentioned that this filtering can be LMS, or Least Mean Square, adaptive filtering, this type of filtering having been described in the aforementioned publication published by J. J. SHYNK.

However, in accordance with a particularly advantageous aspect of the process, object of the present invention, the aforementioned adaptive filtering is applied in the cepstral domain and not in the spectral domain, as in the prior art.

Consequently, and according to a particularly advantageous aspect of the process forming the object of the present invention:

The equalisation is thus based on the fact that long-term cepstral representation of this signal can be approximated by a constant.

For a more detailed description of the elements relating to the long-term cepstral representation of the signal, in particular on the statistics relating to this representation and on the possibility of identifying the transmission channel by using the long-term cepstrum, reference can be made to the article published by C. MOKBEL, D. JOUVET and J. MONNE previously mentioned in the specification.

Adaptive filtering is applied directly in the cepstral domain, which obviously involves block processing of the digital signal under consideration as mentioned hereinbefore in the specification.

A written account of the procedure for blind deconvolution by adaptive filtering, according to the object of the present invention, will now be given hereinafter.

Assuming that the observed signal s(k), that is the transmitted digital signal $\{s_n(t)\}$, is the convolution product of a clean signal, that is the product of the speech signal x(k) transmitted by the filter identifying the telephone channel with a transfer function w(k), the observed signal s(k) verifies relation (1):

$$s(k)=x(k)*w(k)$$

In this relation, the operator * represents the operator which is a product of convolution.

Deconvolution in the Spectral Domain

In order to introduce deconvolution in the cepstral domain, a theoretical reminder of deconvolution in the spectral domain is firstly introduced. With reference to the aforementioned relation (1), the expression of the spectral power density of the two terms in the aforementioned relation (1) is written, for each window or block of the speech signal, according to relation (2):

$$S_s(f)=S_x(f)W^2(f)$$

In this relation, $S_s(f)$, $S_x(f)$ respectively represent the spectral power densities of the observed signal s(k) and of the transmitted speech signal x(k), whereas W(f) represents the transfer function of the telephone channel.

Note that W(f) actually designates the Fourier transform of the filter identifying the telephone channel w(k).

In view of the foregoing relations, an adaptive filter with transfer function H(f) can be applied directly to the spectral power density of the observed signal $S_s(f)$ in order to obtain the equalised spectrum $S_n(f)$ in which the effect of the telephone line or of the transmission channel has been suppressed.

Under these circumstances, the equalised spectrum $S_n(f)$ verifies relation (3):

$$S_n(f)=S_s(f)H(f)=S_x(f)W^2(f)H(f).$$

On the basis of a constant flat spectrum constituting a reference signal R(f), the error E(f) for each window of the observed signal verifies relation (4):

$$E(f)=R(f)-S_x(f)W^2(f)H(f).$$

The optimum filter toward which the transfer function H(f) converges is the one that enables the mean square error, designated MSE, to be minimised in each of the frequency bands f in which the decomposition into frequency bands, spectral decomposition, has been carried out. The mean square error MSE(f) verifies relation (5):

$$MSE(f)=E[E^2(f)].$$

In view of some widely verified hypotheses, long-term spectrum of the speech signal constant and transfer function of the telephone channel W(f) constant over a wide horizon, the optimum filter is the one that enables the expression given by relation (6) to be minimised:

$$MSE(f)=R^2(f)+\overline{S_x^2(f)}W^4(f)H^2(f)-2R\overline{(f)S_x(f)}W^2(f)H(f)$$

whatever the value of f, that is in all frequency bands in which the observed signal has been broken down.

Minimisation of the mean square error MSE(f, given by the foregoing relation (6) enables the transfer function of the optimum filter $H_{opt}(f)$ to be obtained, which verifies relation (7):

$$H_{opt}(f) = \frac{R(f)\overline{S_x(f)}}{\overline{S_x^2(f)}} \frac{1}{W^2(f)} = Cte \frac{1}{W^2(f)}.$$

The optimum filter thus obtained enables the effect of the transmission channel, that is of the telephone communication, to be compensated.

Furthermore, if a specific reference signal R(f) is considered, that is a reference signal having the same power as the signal, the expression $E[R(f)S_x(f)]$ tends to be equal to $E[S_x^2(f)]$ and, under these circumstances, the optimum filter approaches the reverse of the transmission channel.

Deconvolution in the Cepstral Domain

By analogy, in the cepstral domain, the foregoing relation (3) is written in accordance with relation (8):

$$C_n(i)=C_s(i)+C_H(i)=C_x(i)+C_w(i)+C_H(i).$$

In this relation, $C_n(i)$, $C_s(i)$, $C_x(i)$, $C_w(i)$ and $C_H(i)$ respectively represent the equalised cepstrum, the cepstrum of the observed signal, the cepstrum of the actual speech signal, that is prior to transmission via the telephone line or the transmission channel, the cepstral representation of the effect of the line and of the equalising filter.

Taking into account the fact that a constant cepstrum R(i) is used as reference, the error E(i) for each window of the observed signal verifies relation (9):

$$E(i)=R(i)-(C_x(i)+C_w(i)+C_H(i)).$$

The optimum filter toward which the transfer function H(i) of the filter converges is the one that enables the mean square error MSE(i) in each of the quefrencies to be minimised according to relation (10):

$$MSE(i)=E[E^2(i)].$$

In view of certain hypotheses similar to the hypotheses taken into consideration in the frequency domain, these hypotheses being expressed in the quefrential domain, that is long-term cepstrum of speech constant, cepstral representation of the effect of the transmission line constant over a wide horizon, the optimum filter is the one that enables the mean square error to be minimised and which consequently verifies relation (11):

$$C_{Hopt}(i)=R(i)\overline{-C_x(i)}-C_w(i)=Cte-C_w(i)$$

The optimum filtering applied in the cepstral domain therefore enables the effect of the transmission channel to be compensated.

When the reference cepstrum R(i) equal to the mean value of the long-term cepstrum, designated $\overline{C_x}(i)$, is selected, optimum filtering approaches the reverse of the transmission channel.

Comparison of the approach corresponding to the procedure for blind equalisation according to the process forming the object of the present invention, with the conventional approach of high-pass filtering or cepstral subtraction does in fact demonstrate that, from the point of view of recognition performance, this mode of operation substantially equates to the performance of prior art solutions and sometimes significantly exceeds them in certain databases, as will be described in more detail later in the specification.

With regard to stage 1000 of transformation of the observed digital signal $\{s_n(t)\}$ into a set of cepstral vectors, a detailed description of the actual transformation procedure will now be given with reference to FIG. 2b.

In the aforementioned figure, the transformation stage 1000 consists successively in subjecting, in a stage 1000a, the digital speech signal $\{s_n(t)\}$ to a frequency transform transmitting a frequency spectrum $\{S_n(f)\}$ of the digital speech signal $\{s_n(t)\}$ over the horizon under consideration. It will in fact be remembered that the observed digital signal $\{s_n(t)\}$ is subdivided into successive blocks of samples so processing can be carried out in blocks. The frequency transform used can consist, for example, of a rapid Fourier transform.

Stage 1000a is itself followed by a stage 1000b consisting in decomposing the frequency spectrum $\{S_n(f)\}$ obtained by means of the frequency transform used in stage 1000a into frequency sub-bands, to generate a plurality of signals in frequency sub-bands designated $\{V_n(j)\}$. It is stated that the index j here designates the rank of each frequency sub-band under consideration. In practice, it is mentioned that the decomposition into frequency sub-bands carried out in stage 1000b can be carried out by means of a suitable bank of frequency filters, and the spectrum of the signal $\{s_n(f)\}$ can be subdivided, for example, into 24 adjacent frequency bands.

The aforementioned stage 1000b is itself followed by a stage 1000c consisting in subjecting each signal in frequency sub-bands, that is each signal $V_n(j)$, to logarithmic attenuation to generate a plurality of attenuated signals in frequency sub-bands which are therefore designated $\{LV_n(j)\}$.

The attenuated set of signals in frequency sub-bands $\{LV_n(j)\}$ is then subjected to reverse frequency transformation to generate the set of cepstral vectors designated $\{C_n(i)\}$. The reverse frequency transform is produced, for example, by means of a reverse rapid Fourier transform when the frequency transform carried out in stage 1000a is carried out in the form of a direct rapid Fourier transform.

With regard to calculation of the reference cepstrum $\{R_n(i)\}$, it is mentioned that it can advantageously consist of a cepstrum signal of constant value for each of the cepstral vectors $\{C_n(i)\}$. This constant cepstral signal is representative, in the digital speech signal and in the set of cepstral vectors, of the long-term cepstrum of the speech signal. In general, it is stated that the reference cepstrum can be obtained from a database, as will be described later in the specification.

A more detailed description of a device for blind equalisation of the effects of a transmission channel on a digital speech signal enabling the implementation of the process forming the subject of the present invention will now be given with reference to FIG. 3a, 3b and 3c.

Figure 3A:
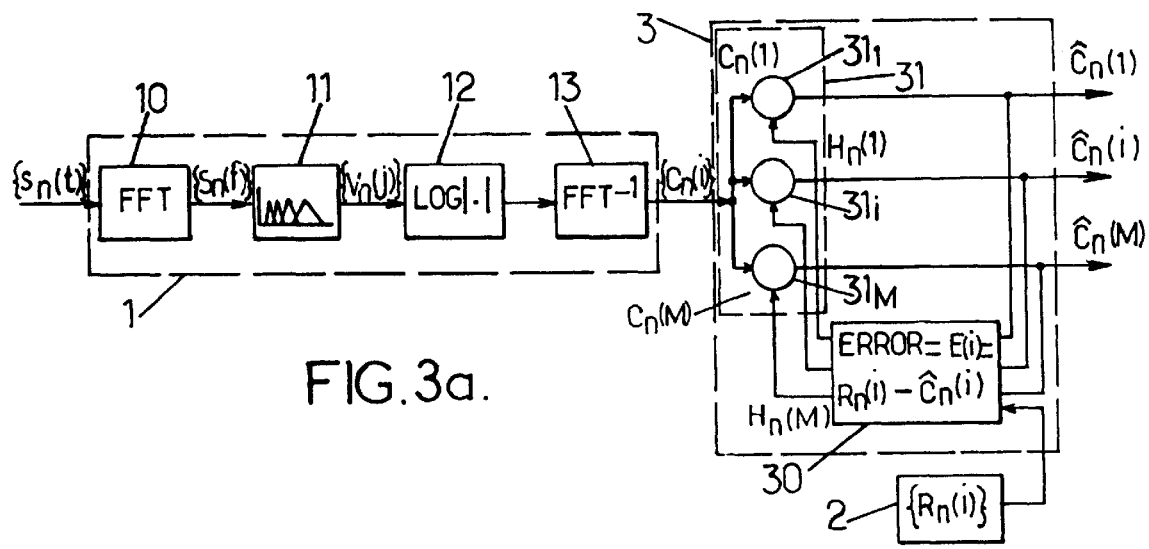
FIG. 3a shows, in the form of a functional diagram, a device for blind equalisation of the effects of a transmission channel on a digital speech signal, object of the present invention.

As shown in FIG. 3a, and for a digital speech signal $\{s_n(t)\}$ passing through the framework of a telephone communication, the device according to the object of the present invention comprises at least one module 1 for transformation of the digital speech signal $\{s_n(t)\}$ into a set of cepstral vectors $\{C_n(i)\}$ representative of the digital speech signal over the given horizon and, in particular, for the window of rank n of the observed digital speech signal. The aforementioned module 1 is followed by a module 2 that generates a reference cepstrum representative, for each of the cepstral vectors $\{C_n(i)\}$, of the long-term cepstrum of the speech signal. The reference cepstrum enables a reference cepstrum $\{R_n(i)\}$ representative of the long-term cepstrum of the speech signal to be associated with each cepstral vector $\{C_n(i)\}$, for each of these vectors, under conditions which will be explained later in the specification. It will therefore be understood that the value of the reference cepstrum can advantageously be approximated by a time constant. However, the distribution $R_n(i)$ of this value for each component $C_n(i)$ of rank i of the cepstral vectors can differ as a function of the rank i under consideration. However, in a particular, non-limiting embodiment, the reference cepstrum $\{R_n(i)\}$ had a constant value that was identical for each component, or corresponding cepstral coefficient $C_n(i)$ of rank i, the component constituting each cepstral vector $\{C_n(i)\}$.

An adaptive filtering module 3 is proposed on the basis of the reference cepstrum of each of the cepstral vectors $\{C_n(i)\}$, this module 3 enabling generation of equalised cepstral vectors in which the effect of telephone communication is substantially suppressed.

It will be understood, in particular, that the adaptive filtering module 3 enables, on the basis of the reference cepstrum $\{R_n(i)\}$ representative of the long-term cepstrum of this speech signal for each of the cepstral vectors, filtering, of the LMS type for example, to be performed that enables, on the basis of the calculation of error between the reference cepstrum $\{R_n(i)\}$ and the set of equalised cepstral vectors, generation of equalised cepstral vectors $\{\hat{C}_n(i)\}$. The set of equalised cepstral vectors is representative of an equalised digital speech signal.

As shown in FIG. 3a, the module 1 for transforming the digital speech signal into a set of cepstral vectors comprises at least, receiving the observed speech signal $\{s_n(t)\}$, a module 10 for frequency transform of the digital speech signal transmitting a frequency spectrum of the digital speech signal designated $\{S_n(f)\}$ over the horizon under consideration, a bank of filters 11 for decomposing, into N frequency sub-bands, the frequency spectrum of the digital speech signal, this bank of filters 11 transmitting N signals in frequency sub-bands designated $\{V_n(j)\}$.

The bank of filters 11 is in turn followed by a module 12 for logarithmic attenuation of each signal in frequency sub-bands, this module 12 transmitting a plurality of attenuated signals in frequency sub-bands designated $\{LV_n(j)\}$.

Finally, the module 1 also comprises a module 13 for reverse frequency transform receiving the attenuated signals in frequency sub-bands $\{LV_n(j)\}$ enabling the set of cepstral vectors $\{C_n(i)\}$ to be generated on the basis of attenuated signals in frequency sub-bands.

With regard to the module 2 that generates the reference cepstrum, it is stated that, for a set of cepstral vectors $\{C_n(i)\}$ wherein $i \in [1,M]$, the reference cepstrum $\{R_n(i)\}$ is representative, for each of the cepstral vectors, of the long-term cepstrum of the speech signal. It will therefore be appreciated that the database constituting the reference cepstrum generator 2 can be organised so as to transmit the reference cepstrum representative of the long-term cepstrum of the speech signal as a function of the index i designating the component of the cepstral vector $\{C_n(i)\}$.

Furthermore, as shown in FIG. 3a, the adaptive filtering module 3 comprises at least one module 30 for calculating the error signal between each corresponding equalised cepstral vector $\{\hat{C}_n(i)\}$ and the corresponding reference cepstrum $\{R_n(i)\}$. The error signal $E(i)=R_n(i)-\hat{C}_n(i)$ is calculated between each component of rank i of the reference cepstrum and of the equalised cepstral vector. A module 31 for equalising each cepstral vector $\{C_n(i)\}$ is also provided, this equalising module enabling generation, on the basis of each component $C_n(i)$ and this error signal, of a corresponding equalised cepstral vector $\{\hat{C}_n(i)\}$ under conditions which will be explained hereinafter with reference to FIG. 3b and 3c. In fact, the error signal can be weighted or adapted.

Figure 3B:
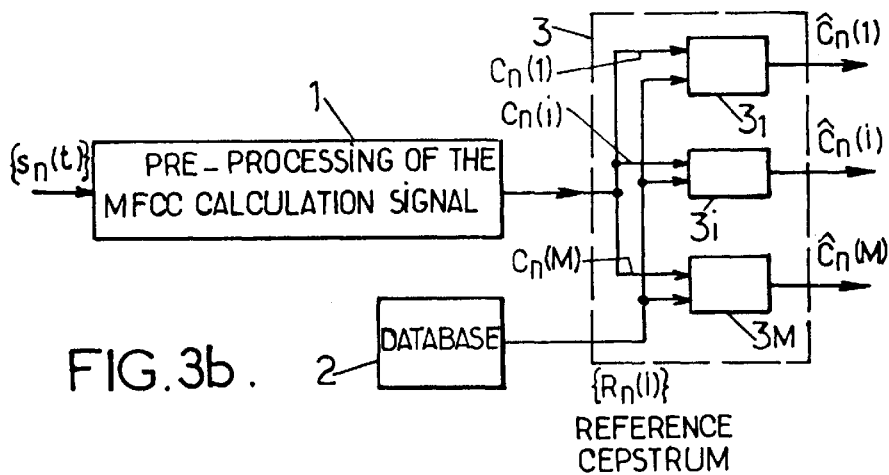

FIG. 3b shows the device, object of the present invention, in a particular embodiment orientated towards an application to the PHIL90 automatic speech recognition system previously mentioned in the specification.

The same reference numerals obviously designate the same elements, but the module 1 in FIG. 3a is organised so as to calculate the MFCCs previously explained in the specification and consequently transmits the corresponding cepstral vector $\{C_n(i)\}$ of components $C_n(1)$, $C_n(i)$ to $C_n(M)$ for each successive window of the observed digital speech signal. The modules 2 and 3 in FIG. 3b represent modules similar to those of modules 2 and 3 in FIG. 3a. However, the module for calculating error between the reference cepstrum $\{R_n(i)\}$ and each equalised cepstral vector $\{\hat{C}_n(i)\}$ is explained and represented 3i as relating to each component $\hat{C}_n(i)$ of the equalised cepstral vector, each module 3i being identical and actually ensuring, for each component $C_n(i)$ of the cepstral vector $\{C_n(i)\}$, the same function of error calculation and equalisation of this component so as to transmit a component of the corresponding equalised cepstral vector $\{\hat{C}_n(i)\}$.

Figure 3C:
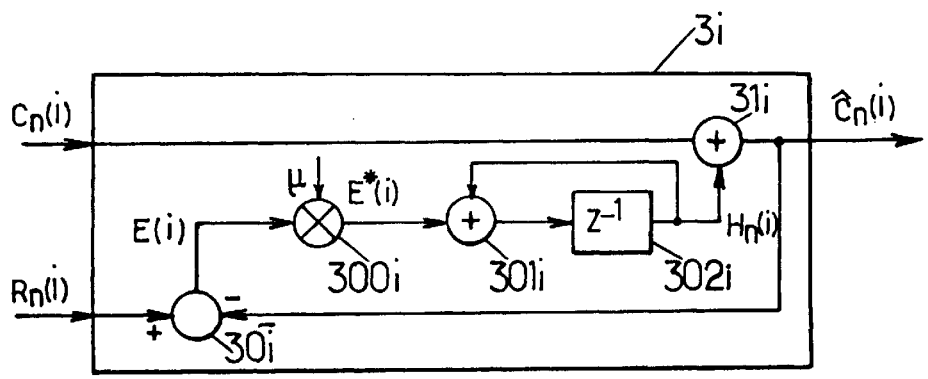

As shown in FIG. 3c, each module 3i advantageously comprises a subtractor circuit 30i receiving, on the one hand the component $R_n(i)$ of the corresponding reference cepstrum $\{R_n(i)\}$ on its positive terminal as well as, on the other hand, the equalised cepstral coefficient $\hat{C}_n(i)$ on a negative terminal to enable calculation of the error according to an error signal $E(i)$.

Each module 3i also receives the corresponding cepstral coefficient $C_n(i)$ on an adder circuit 31i which actually enables this cepstral coefficient $C_n(i)$ to be equalised in order to transmit an equalised cepstral coefficient $\hat{C}_n(i)$.

Furthermore, as shown in FIG. 3c, each module 3i and, in particular, the module for equalising each cepstral coefficient $C_n(i)$ advantageously comprises a circuit 300i which multiplies by a multiplying coefficient $\mu$, this multiplier circuit receiving the error signal $E(i)$ transmitted by the subtractor circuit 30i and transmitting a weighted error signal $E^*(i)$. The multiplier circuit 300i is followed by an adder circuit 301i with two inputs and one output, a first input of the first adder circuit 301i receiving the weighted error signal $E^*(i)$ and a second input of this adder circuit receiving the signal transmitted thereby via a slow-rise circuit 302i. The slow-rise circuit 302i actually introduces a delay equal to the duration of a block of samples of digital signal. The output of the slow-rise circuit 302i transmits an adaptation signal $H_n(i)$ that is transmitted to the equalising adder circuit 31i. The adaptation circuit thus formed by the multiplier circuit 300i, the adder circuit 301i and the slow-rise circuit 302i therefore enables the error signal E(i) to be adapted or weighted in order to transmit the adaptation signal $H_n(i)$. Upon adaptation of the error signal performed by the adaptation circuit, the equalising adder circuit 31i transmits the corresponding equalised cepstral coefficient $\hat{C}_n(i)$. As will be seen in FIG. 3b, the same applies to all the components of the cepstral vectors of rank i comprised between 1 and M of the embodiment under consideration.

The device forming, object of the present invention, as shown in FIG. 3b and 3c, has been implemented and comparison tests have enabled the proposed blind equalisation technique to be tested on various specific databases.

The tests have been carried out by inputting a file of 10 cepstral coefficients, applying the adaptive filtering and saving the MFCC vectors thus obtained at the output of the filter. The MFCC files are directly used by the PHIL90 system.

The following table shows the improvements obtained in relation to a conventional technique, designated base system, a cepstral subtraction procedure as defined, for example, in the prior art, by C. MOKBEL, J. MONNE and D. JOUVET previously referred to in the specification, adaptive filtering in the spectral domain as carried out, for example in accordance with the process and system described in French patent application No. 94 08741 previously mentioned in the specification and, finally, adaptive filtering in the cepstral domain according to the process and device that are the object of the present invention.

These techniques are applied on four different databases designated successively in the aforesaid table by Digits, Two-digit numbers, Trégor and Baladins.

The first three databases are so-called laboratory databases with recordings that originate from forewarned, co-operative speakers.

The last database, Baladins, is a so-called operating database obtained by recording calls to a server in operation. The conditions for recording operating databases are closer to actual operating conditions. The results of recognition on these databases are therefore closer to the performance obtained in operation. The improvements shown in the last column of the table as Reduction in the error rate are given in relation to the reference version of the PHIL90 system. The range indicated between brackets next to the error rate of the base system represents the 95% confidence interval.

With regard to the cepstral subtraction procedure, this process appears efficient at least for the Digits and Two-digit number databases. However, implementation of this procedure is difficult to implement on line in real time because this implementation is based on an estimate of the average of the cepstral vectors in silence or over a wide horizon of speech.

|  | Error rate | Reduction in the error rate |
|---|---|---|
| Digits |  |  |
| Base system | 0.63% [0.44–0.90] |  |
| Cepstral subtraction | 0.40% | 36.7% |
| Adaptive filtering (spectral domain) | 0.52% | 16.7% |
| Adaptive filtering (cepstral domain) | 0.46% | 26.7% |
| Number with two digits |  |  |
| Base system | 3.2% [2.82–3.63] |  |
| Cepstral subtraction | 2.5% | 21.1% |
| Adaptive filtering (spectral domain) | 2.6% | 18.5% |
| Adaptive filtering (cepstral domain) | 2.5% | 21.1% |
| Trégor |  |  |
| Base system | 0.40% [0.30–0.53] |  |
| Cepstral subtraction | 0.34% | 13.7% |
| Adaptive filtering (spectral domain) | 0.33% | 17.6% |
| Adaptive filtering (cepstral domain) | 0.26% | 35.3% |
| Baladins |  |  |
| Base system | 3.8% [2.44–3.68] |  |
| Cepstral subtraction | 3.2% | 12.7% |
| Adaptive filtering (spectral domain) | 3% | 19.1% |
| Adaptive filtering (cepstral domain) | 2.7% | 29.1% |

With regard to the actual construction of the device, object of the present invention, it can obviously employ structures already used in the context of the PHIL90 system previously mentioned in the specification.

The equalising device according to the present invention, applied in the cepstral coefficient space is very economical in calculating time. In fact, it demands M multiplications and 3M additions for each parameter vector, every 16 ms, where M obviously designates the number of cepstral coefficients. The number of operations required therefore appears equal to a multiplication and three additions per filter output. This calculating cost is substantially negligible in relation to the volume of calculation involved when determining parameter vectors.

In view of these findings, it is mentioned that the calculating cost of the filter used is low and that installation thereof does not give rise to problems of calculation in real time.

In relation to the solution proposed by French patent application No. 94 08741, the cost in calculating volume is reduced because there is only one multiplication and three additions per filter output rather than three multiplications and two additions in the aforementioned solution whereas the filter in the cepstral domain, furthermore, comprises fewer outputs than in the spectral domain. Furthermore, as the dynamics of cepstral coefficients are lower than those of spectral coefficients and corresponding vectors, the precision in number of bits allocated to the aforementioned variables demanded in the calculations is less important. The results obtained are equivalent or slightly higher; this is the case, in particular, with the databases mentioned in the aforementioned table with respect to the technique described in the above-mentioned patent application No. 94 08741.

We claim:

1. Process for the blind equalisation of the effects of a transmission channel on a digital speech signal ($\{s_n(t)\}$) passing through said transmission channel, said process involving at least:

transforming said digital speech signal into a set of cepstral vectors, the set of cepstral vectors being representative of said digital speech signal over a given horizon;

calculating a reference cepstrum ($\{R_n(i)\}$) representative, for each of the cepstral vectors of said set of cepstral vectors of the long-term cepstrum of said speech signal, said reference cepstrum ($\{R_n(i)\}$) consisting of a constant cepstrum signal for each of the cepstral vectors representative in the digital speech signal and in the set of cepstral vectors of the long-term cepstrum in the speech signal;

subjecting each of the cepstral vectors to adaptive filtering on the basis of said reference cepstrum, in order to generate a set of equalised cepstral vectors ($\{\hat{C}_n(i)\}$) in which the effects of said transmission channel are substantially suppressed, said set of equalised cepstral vectors being representative of an equalised digital speech signal.

2. Process according to claim 1, wherein the cepstral transformation involves successively:

subjecting said digital speech signal ($\{s_n(t)\}$) to a frequency transform transmitting a frequency spectrum ($\{S_n(f)\}$) of said digital speech signal ($\{s_n(t)\}$) over the horizon under consideration;

decomposing said frequency spectrum ($\{S_n(f)\}$) into frequency sub-bands to generate a plurality of signals in frequency sub-bands ($\{V_n(j)\}$);

subjecting each signal in frequency sub-bands to logarithmic attenuation to generate a plurality of attenuated signals in frequency sub-bands ($\{LV_n(j)\}$);

subjecting the attenuated set of signals in frequency sub-bands to reverse frequency transformation to generate said set of cepstral vectors ($\{C_n(i)\}$).

3. Process according to claim 1, wherein the reference cepstrum ($\{R_n(i)\}$) has a constant value which is identical for each component or cepstral coefficient ($C_n(i)$) of corresponding rank i, constituting each cepstral vector ($\{C_n(i)\}$).

4. Process according to claim 1, wherein said adaptive filtering involves, for each of the cepstral vectors on the basis of said reference cepstrum ($\{R_n(i)\}$) representative of the long-term cepstrum of this speech signal, for each of the cepstral vectors, carrying out least mean square (LMS) type filtering, said LMS type filtering enabling said equalised cepstral vectors to be generated on the basis of the calculation of error between said reference cepstrum ($\{R_n(i)\}$) and the set of said equalised cepstral vectors.

5. Device for the blind equalisation of the effects of a transmission channel on a digital speech signal ($\{s_n(t)\}$) passing through said transmission channel, comprising at least:

means for transforming said digital speech signal into a set of cepstral vectors, said set of cepstral vectors being representative of said digital speech signal over a given horizon;

means for generating a reference cepstrum that is representative, for each of the cepstral vectors of said set of cepstral vectors, of the long-term cepstrum of this speech signal;

means for adaptive filtering, on the basis of said reference cepstrum, of each of the cepstral vectors enabling generation of a set of equalised cepstral vectors in which the effect of said transmission channel are substantially suppressed, said set of equalised cepstral vectors being representative of an equalised digital speech signal, said means for adaptive filtering comprising at least for each cepstral vector ($\{C_n(i)\}$), ie and for a reference cepstrum ($\{R_n(i)\}$) representative, for each of the cepstral vectors, of the long-term cepstrum of this speech signal, means for calculating an error signal (E(i)) between each component of rank i ($\hat{C}_n(i)$) of each equalised cepstral vector ($\{\hat{C}_n(i)\}$) and the corresponding component of identical rank ($R_n(i)$) of the reference cepstrum ($\{R_n(i)\}$), $E(i)=R_n(i)-\hat{C}_n(i)$); and means for equalisation of said cepstral vector ($\{C_n(i)\}$) transmitting a component ($\hat{C}_n(i)$) of the equalised cepstral vector ($\{\hat{C}_n(i)\}$) on the basis of each component ($C_n(i)$) of each cepstral vector ($\{C_n(i)\}$) and said error signal (E(i)).

6. Device according to claim 5, wherein said means of transformation of said digital speech signal into a set of cepstral vectors comprise at least:

means for the frequency transform of said digital speech signal transmitting a frequency spectrum of said digital speech signal ($\{s_n(t)\}$) over the horizon under consideration;

a bank of filters for decomposing, into N frequency sub-bands, said frequency spectrum of said digital speech signal transmitting N signals in frequency sub-bands ($\{V_n(j)\}$);

means of logarithmic attenuation of each signal in frequency sub-bands transmitting a plurality of attenuated signals in frequency sub-bands ($\{LV_n(j)\}$);

means for reverse frequency transform enabling said set of cepstral vectors ($\{C_n(i)\}$) to be generated on the basis of said attenuated signals in frequency sub-bands ($\{LV_n(j)\}$).

7. Device according to claim 5, wherein said means for calculating the error signal (E(i)) and said means for equalisation of said cepstral vector ($\{C_n(i)\}$) comprise, for each component ($C_n(i)$) of said cepstral vector, a subtractor circuit receiving said component ($R_n(i)$) of the reference cepstrum ($\{R_n(i)\}$) and said component ($\hat{C}_n(i)$) of said equalised cepstral vector ($\{\hat{C}_n(i)\}$) and transmitting said error signal (E(i));

means for adaptation of this error signal (E(i)) comprising:

a circuit which multiplies by a multiplying coefficient $\mu$ transmitting a weighted error signal (E*(i));

an adder circuit with two inputs and one output, a first input receiving said weighted error signal (E*(i)) and a second input receiving the signal transmitted by said first adder circuit via a slow-rise circuit that delays by a predetermined duration, the output of said slow-rise circuit transmitting an adaptation signal ($H_n(i)$); and an equalising adder circuit receiving said cepstral coefficient ($C_n(i)$) and said adaptation signal ($H_n(i)$) and transmitting said equalised cepstral coefficient ($\hat{C}_n(i)$).

* * * * *